United States Patent
Chen et al.

(10) Patent No.: US 12,413,906 B2
(45) Date of Patent: Sep. 9, 2025

(54) AUDIO SIGNAL ENHANCEMENT METHOD, APPARATUS, DEVICE, AND READABLE STORAGE MEDIUM

(71) Applicant: AAC Technologies (Nanjing) Co., Ltd., Nanjing (CN)

(72) Inventors: Yangzhen Chen, Nanjing (CN); Lijian Ye, Nanjing (CN)

(73) Assignee: AAC Technologies (Nanjing) Co., Ltd., Nanjing (CN)

(*) Notice: Subject to any disclaimer, the term of this patent is extended or adjusted under 35 U.S.C. 154(b) by 237 days.

(21) Appl. No.: 18/327,009

(22) Filed: May 31, 2023

(65) Prior Publication Data

US 2024/0214730 A1    Jun. 27, 2024

Related U.S. Application Data

(63) Continuation of application No. PCT/CN2023/081940, filed on Mar. 16, 2023.

(30) Foreign Application Priority Data

Dec. 21, 2022    (CN) .......................... 202211649357.3

(51) Int. Cl.
*H04R 3/04*      (2006.01)
*G06F 18/241*    (2023.01)

(52) U.S. Cl.
CPC ............. *H04R 3/04* (2013.01); *G06F 18/241* (2023.01); *H04R 2430/01* (2013.01)

(58) Field of Classification Search
CPC ...... H04R 3/04; H04R 2430/01; G06F 18/241
See application file for complete search history.

(56) References Cited

U.S. PATENT DOCUMENTS

| | | | |
|---|---|---|---|
| 2019/0082276 A1* | 3/2019 | Crow | H04R 25/505 |
| 2019/0392852 A1* | 12/2019 | Hijazi | G06N 3/084 |
| 2020/0344545 A1* | 10/2020 | Hvidsten | G06F 3/165 |
| 2020/0349965 A1* | 11/2020 | Nesta | G06N 3/088 |

\* cited by examiner

*Primary Examiner* — Akelaw Teshale
(74) *Attorney, Agent, or Firm* — Wiersch Law Group

(57) ABSTRACT

The present application provides an audio signal enhancement method, apparatus, device and readable storage medium. Firstly, the first audio feature corresponding to the actual audio signal is obtained. Then, the first audio feature is inputted to a trained classifier for classification and identification, to obtain the audio-type representation data corresponding to the actual audio signal. Finally, a target audio signal conforming to a target audio type in the actual audio signal is enhanced with reference to the audio-type representation data, to obtain an enhanced audio signal. Through the implementation of the present application, the actual audio signal is classified and identified using the trained classifier, and the target audio signal conforming to the target audio type is enhanced, thereby effectively enhancing the target audio signal and improving the accuracy of enhancing the target audio signal.

7 Claims, 7 Drawing Sheets

Audio Signal Enhancement Apparatus

Obtaining Module
601

Classifying Module
602

Enhancing Module
603

FIG. 6

AUDIO SIGNAL ENHANCEMENT METHOD, APPARATUS, DEVICE, AND READABLE STORAGE MEDIUM

TECHNICAL FIELD

The present application relates to the field of audio processing technologies, in particular to an audio signal enhancement method, apparatus, device, and readable storage medium.

BACKGROUND

As an increasing number of domestic and foreign games continue to enter the public eye, playing games through electronic devices has become a popular form of leisure and entertainment. The sound of the game is played through a built-in micro-speaker of electronic devices such as mobile phones, but due to its low power, the playback effect of weak audio signals in the game, such as footstep sounds, is not effective. In the related art, in order to enhance weak audio signals in programs, a fixed gain equalizer (EQ) or dynamic range control (DRC) is usually used. However, this approach can compress the dynamics of other audio signals such as gunshots or propeller sounds, or affect the timbre of other sound signals when tuning footstep sounds.

SUMMARY

An objective of the present application is to provide an audio signal enhancement method, apparatus, device, and readable storage medium, which can at least solve the problem of affecting other audio signals when enhancing the target weak audio signal in the related art.

In a first aspect, embodiments of the present application provide an audio signal enhancement method, comprising:
  obtaining a first audio feature corresponding to an actual audio signal;
  inputting the first audio feature to a trained classifier for classification and identification, to obtain audio-type representation data corresponding to the actual audio signal; and
  enhancing a target audio signal conforming to a target audio type in the actual audio signal with reference to the audio-type representation data, to obtain an enhanced audio signal.

In a second aspect, embodiments of the present application provide an audio signal enhancement apparatus, comprising:
  an obtaining module, configured to obtain a first audio feature corresponding to an actual audio signal;
  a classifying module, configured to input the first audio feature to a trained classifier for classification and identification, to obtain audio-type representation data corresponding to the actual audio signal; and
  an enhancing module, configured to enhance a target audio signal conforming to a target audio type in the actual audio signal with reference to the audio-type representation data, to obtain an enhanced audio signal.

In a third aspect, embodiments of the present application provide an electronic device, comprising:
  a memory; and
  a processor configured to execute a computer program stored in the memory;
  wherein the processor executes the computer program to implement steps of the above-mentioned method.

In a fourth aspect, embodiments of the present application provide a computer-readable storage medium having a computer program stored thereon, wherein the computer program, when executed by the processor, implements steps of the above-mentioned method.

As seen above, according to the audio signal enhancement method, apparatus, device, and readable storage medium provided in the present application, the first audio feature corresponding to the actual audio signal is obtained. The first audio feature is inputted to a trained classifier for classification and identification, to obtain the audio-type representation data corresponding to the actual audio signal. A target audio signal conforming to a target audio type in the actual audio signal is enhanced with reference to the audio-type representation data, to obtain an enhanced audio signal. Through the implementation of the present application, the actual audio signal is classified and identified using the trained classifier, and the target audio signal conforming to the target audio type is enhanced, thereby effectively enhancing the target audio signal and improving the accuracy of enhancing the target audio signal.

BRIEF DESCRIPTION OF THE DRAWINGS

FIG. 6 shows a diagram of a program module of the audio signal enhancement apparatus according to a third embodiment of the present application.

DETAILED DESCRIPTION OF THE EMBODIMENTS

In order to make the objective, features, and advantages of the present application more obvious and understandable, the technical solutions in the embodiments of the present application will be described clearly and completely as follows in conjunction with the accompanying drawings in the embodiments of the present application. Obviously, the described embodiments are only a part of rather than all of the embodiments of the present application. Based on the embodiments in the present application, all other embodiments obtained by those skilled in the art without making creative labor belong to the protection scope of the present application.

Figure 1:
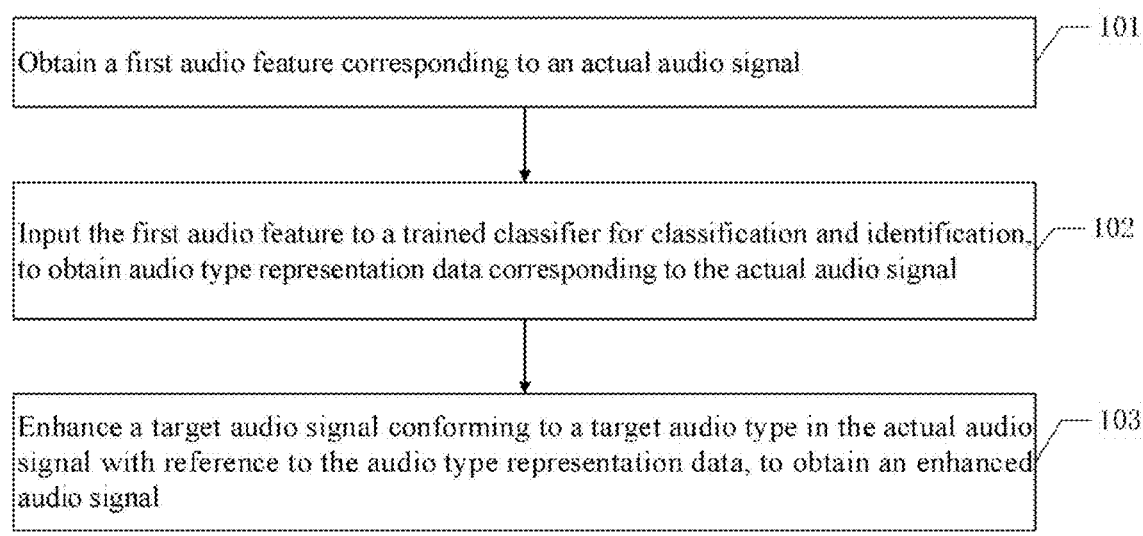
FIG. 1 shows a basic flowchart of an audio signal enhancement method according to a first embodiment of the present application.

In order to solve the problem of affecting other audio signals when enhancing the target weak audio signal in the related art, the first embodiment of the present application provides an audio signal enhancement method, as shown in FIG. 1, which shows a basic flowchart of the audio signal enhancement method according to the present embodiment. The audio signal enhancement method includes the following steps.

Step 101: a first audio feature corresponding to an actual audio signal is obtained.

Specifically, in this embodiment, the actual audio signal may be the audio signal of various types in the actual application scenario such as a certain game, such as footstep sounds, gunshots, or propeller sounds in the game.

In some implementations of this embodiment, the step of obtaining the first audio feature corresponding to the actual audio signal is preceded by: obtaining second frame signals by framing the actual audio signal according to the framing indicator; extracting an audio feature in each of the second frame signal separately to obtain a second audio feature combination, where the audio features include at least one of the following types: time domain feature, frequency domain feature, and time-frequency domain feature; and performing an average operation and a variance operation on a target audio feature in the second audio feature combination to obtain the first audio feature; or, performing an average operation and a variance operation on the second audio feature combination of the actual audio signal and a second audio feature combination of a historical audio signal to obtain the first audio feature, where a moment of obtaining the historical audio signal is before a moment of obtaining the actual audio signal.

Figure 2:
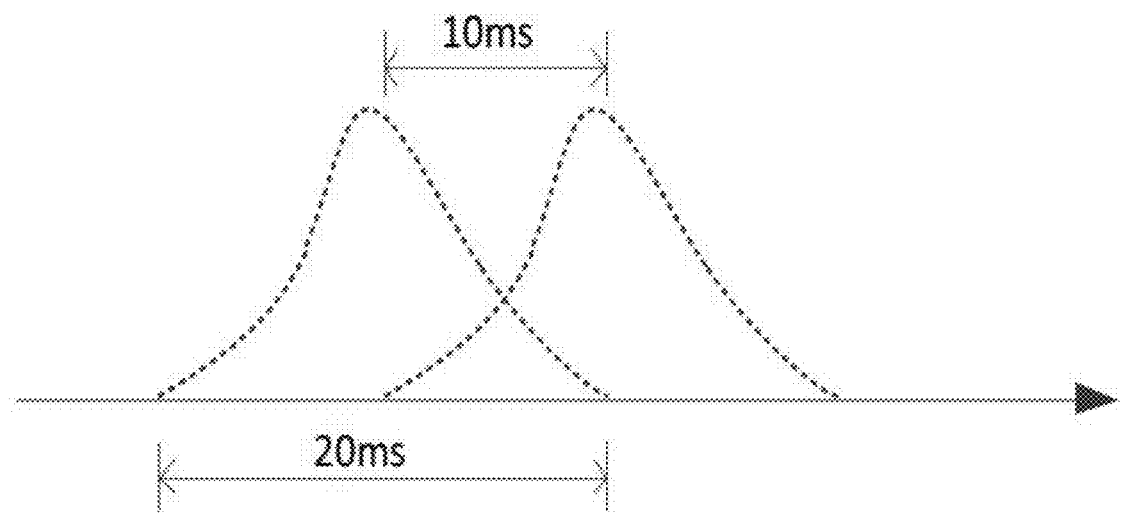
FIG. 2 shows a diagram of a framing process according to the first embodiment of the present application.

Specifically, in this embodiment, the framing indicator includes a unit length of data frames, and an overlap length of adjacent data frames (i.e., frameshift), as shown in FIG. 2, overlapping frames may be optionally used in this embodiment to ensure a smooth transition between frames and maintain continuity. The unit length of the frame may be 20 ms, and a frame overlap length is ½ of the unit length of the frame, i.e., 10 ms. It should be understood that the specific values of the unit of the frame and the overlap length of the frame mentioned in this embodiment are only typical examples and do not constitute a unique limitation to this embodiment. After obtaining the frame signal, audio features are extracted from each frame signal, where the audio features may be time domain features, frequency domain features, time-frequency domain features, such as frequency domain features Mel Frequency Cepstrum Coefficient (MFCC), linear predictive cepstrum coefficient (LPCC). These extracted audio features are combined to obtain an audio feature combination. To improve the robustness of the audio features, the average and variance of the audio feature combinations of multiple adjacent frames are calculated. For example, if MFCC is used as the audio feature, a group of 40-dimensional MFCC coefficients is extracted for each 1-second segment, and then the average and variance are calculated to obtain an 80-dimensional feature vector. Thus, an 80-dimensional feature vector can be obtained every second, which effectively improves the robustness of the audio features. To reduce the computational complexity, the number of adjacent frame signals used in the calculation of the average and variance can be appropriately reduced. In the scenario of real-time detection, the audio feature combination of the currently collected audio signal and the audio feature combination of the audio feature combination of the historically collected audio signal can be used to calculate the mean and variance.

Step 102: the first audio feature is input to the trained classifier for classification and identification, and audio-type representation data corresponding to the actual audio signal is obtained.

Specifically, in this embodiment, after obtaining the audio features, the trained classifier is configured to classify and identify the audio features, and the audio-type representation data corresponding to the actual audio signal is outputted. This embodiment optionally utilizes 0 and 1 to represent audio types, where 1 represents target audio signals such as footstep sounds, and 0 denotes non-target audio signals such as non-footstep sounds.

In some implementations of this embodiment, before the step of inputting the first audio feature to the trained classifier for classification and identification, the method further includes the following steps. A predetermined audio signal sample set is obtained. The second audio features corresponding to each of a plurality of audio signal samples in the audio signal sample set are obtained separately, to obtain an audio feature sample set. A predetermined classifier model is trained based on the audio feature sample set, to obtain a trained classifier.

Specifically, in this embodiment, the predetermined audio signal sample set includes a target audio signal set (e.g., footstep sound audio data set) and a non-target audio signal set (e.g., non-footstep sound audio data set). The target audio signal set and the non-target audio signal set include the target audio signal (e.g., footstep sound) and the non-target audio signal (e.g., non-footstep sound) in various scenarios, respectively. As these two signal sets are used to obtain a classifier, their sizes should be roughly equivalent. For example, the duration of the footstep sound dataset should be 1 hour, and the duration of the non-footstep sound dataset should also be 1 hour, and they should contain as many audio signals from different scenarios as possible. The audio features of the audio signal samples in the audio signal sample set are extracted separately to obtain the audio feature sample set, and the audio feature sample set is divided into a training set and a test set. The pre-prepared classifier model is trained based on the training set of the audio feature sample set and the machine learning classification method, to obtain a classifier capable of correctly distinguishing between the target audio signal and the non-target audio signal. Commonly used machine learning classification methods such as Support Vector Machines (SVM), Gaussian Mixture Models (GMM), and Convolutional Neural Networks may be employed.

Further, in some implementations of this embodiment, before the step of obtaining the second audio features corresponding to the plurality of audio signal samples in the audio signal sample set separately, the method further includes the following steps. According to a predetermined framing indicator, first frame signals are obtained by framing each of the audio signal samples in the audio signal sample set. The framing indicator includes a unit length of each data frame, an overlap length of adjacent data frames. The audio features in each of the first frame signals are extracted separately to obtain a first audio feature combination, where the audio features include at least one of the following types: time domain feature, frequency domain feature, and time-frequency domain feature. An average operation and a variance operation are performed on a target audio feature in the first audio feature combination to obtain the second audio feature.

Specifically, in this embodiment, the extraction and dimension of the audio features in the audio feature sample set are the same as those of the audio features in the actual audio signal, but a greater number of adjacent frames are used in the operation of the audio feature combination in the audio feature sample set. The predetermined framing indicator also includes the unit length of each data frame and the overlapping length of data frames. The overlapping frame method is also used for framing, where the frame length ranges from 10 ms to 20 ms, and a frame overlap length is half of the frame length. After the frame signal is obtained, the audio features are extracted from each frame signal, and the audio features may also be time domain features, frequency domain features, and time-frequency domain features. The extracted audio features are combined to obtain an audio feature combination. Then, an average operation and a variance operation are performed on the audio feature combinations of multiple adjacent frames, to obtain the audio features in the audio feature sample set.

Step 103: a target audio signal conforming to a target audio type in the actual audio signal is enhanced with reference to the audio-type representation data, to obtain an enhanced audio signal.

Specifically, in this embodiment, by referring to the classifier identification output, only the target audio signal conforming to the target audio type in the actual audio signal can be enhanced, thereby obtaining the enhanced audio signal.

In some implementations of the present embodiment, the step of enhancing the target audio signal conforming to the target audio type in the actual audio signal with reference to the audio-type representation data to obtain the enhanced audio signal includes the following steps. A median filtering is performed on the audio-type representation data for a predetermined number of times to obtain audio-type representation data without outliers. A gaining and/or a dynamic range enhancement are performed on the target audio signal in different frequency bands conforming to the target audio type in the actual audio signal when the audio-type representation data without outliers correspond to the target audio type, to obtain the enhanced audio signal.

Specifically, in this embodiment, after outputting the audio-type representation data 0/1 signal, the classifier may also perform the median filtering on the 0/1 signal through the median filter, which may be performed once or twice to remove the outliers and obtain the square wave signal. The window length of the median filter used in this embodiment is 3. When the audio-type representation data is 1, the target audio signal in different frequency bands is enhanced by EQ/DRC through gain and/or dynamic range enhancement. When the audio-type representation data is 0, no enhancement is performed using EQ/DRC. EQ is typically implemented using peak filters to enhance the gain of target audio signals in different frequency bands, while DRC may be multi-band and is configured to apply different dynamic compression or enhancement parameters to the target audio signals in different frequency bands, to obtain an enhanced audio signal.

Further, in some implementations of the present embodiment, the step of performing the gaining and/or the dynamic range enhancement on the target audio signal in the actual audio signal in different frequency bands conforming to the target audio type includes the following step. The gaining is performed with reference to a predetermined equalizer fade-in and fade-out time, and/or, the dynamic range enhancement is performed with reference to a predetermined time parameter for dynamic range control, on the target audio signal in the different frequency bands conforming to the target audio type in the actual audio signal.

Specifically, in this embodiment, since only the target audio signal is enhanced, while non-target audio signals are not enhanced, the hard enhancement method of switching between enhancement and non-enhancement may cause sudden changes in volume and even popping sounds (level jumps). Therefore, the EQ gain for enhancing target audio signals such as footstep sounds, or the time parameters of DRC for dynamic range compression of target audio signals such as footstep sounds, may be adjusted by setting fade-in time (fadein) and fade-out time (fadeout). This soft enhancement approach enables parameters smoothly switch between footstep sounds and non-footstep sounds, thus improving the overall playback effect of the target audio signal source such as footstep sounds in actual scenarios.

In some implementations of the present embodiment, after the step of enhancing the target audio signal conforming to the target audio type in the actual audio signal with reference to the audio-type representation data to obtain the enhanced audio signal, the method further includes the following step. An amplitude limiting processing is performed on the enhanced audio signal to obtain a clipping-free enhanced audio signal.

Figure 3:
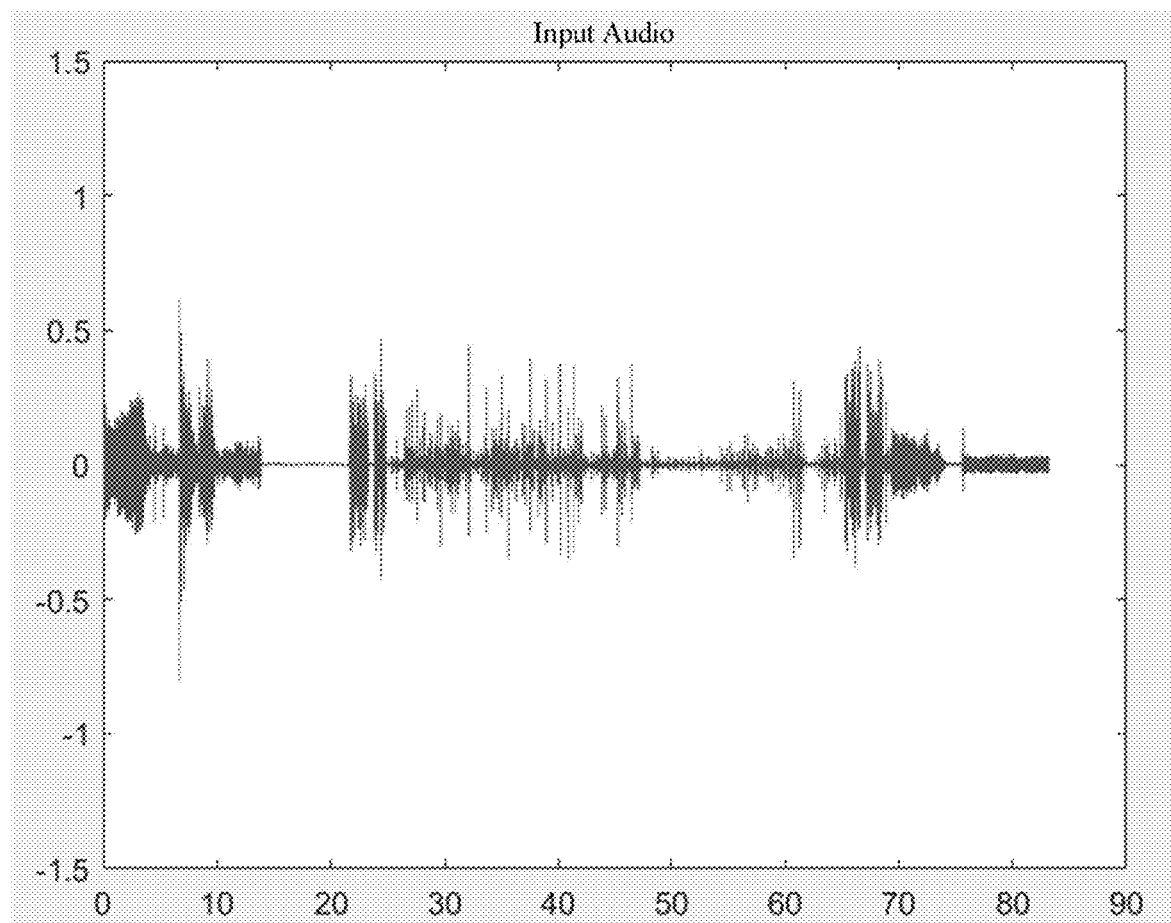
FIG. 3 shows a waveform diagram of input audio according to the first embodiment of the present application.
Figure 4:
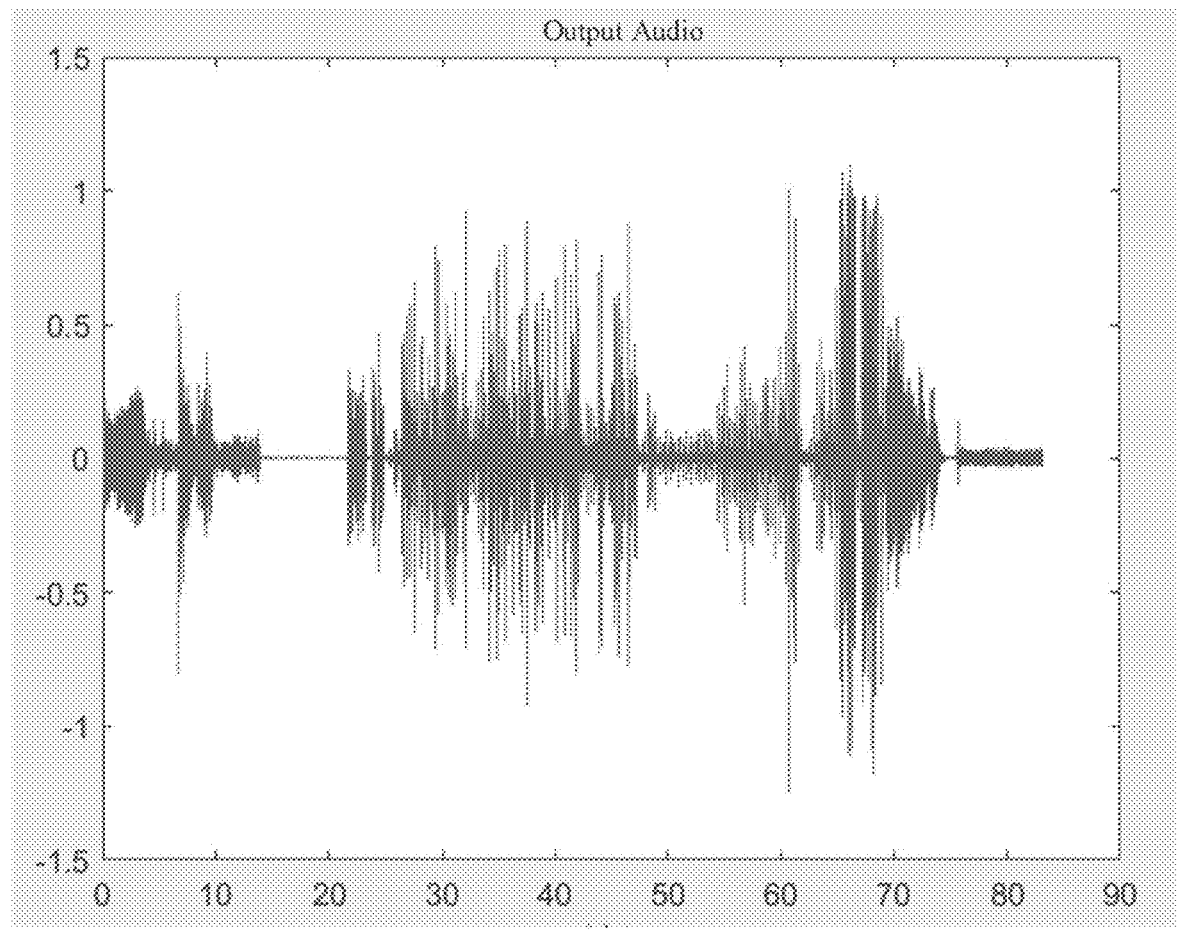
FIG. 4 shows a waveform diagram of output audio according to the first embodiment of the present application.

Specifically, in this embodiment, in order to prevent the enhanced audio signal from being too large and clipping, the enhanced audio signal will also be limited by a limiter to obtain a clipping-free enhanced audio signal. The waveform of the input audio signal is shown in FIG. 3, and the waveform of the output audio signal after enhancement and limiting processing is shown in FIG. 4. The horizontal axis of both waveform graphs represents time in seconds (s), and the vertical axis represents the sound intensity or sound pressure of the audio signal in volts (V).

Based on the above technical solution of the present application, the first audio feature corresponding to the actual audio signal is obtained. The first audio feature is inputted to a trained classifier for classification and identification, to obtain the audio-type representation data corresponding to the actual audio signal. A target audio signal conforming to a target audio type in the actual audio signal is enhanced with reference to the audio-type representation data, to obtain an enhanced audio signal. Through the implementation of the present application, the actual audio signal is classified and identified using the trained classifier, and the target audio signal conforming to the target audio type is enhanced, thereby effectively enhancing the target audio signal and improving the accuracy of enhancing the target audio signal.

Figure 5:
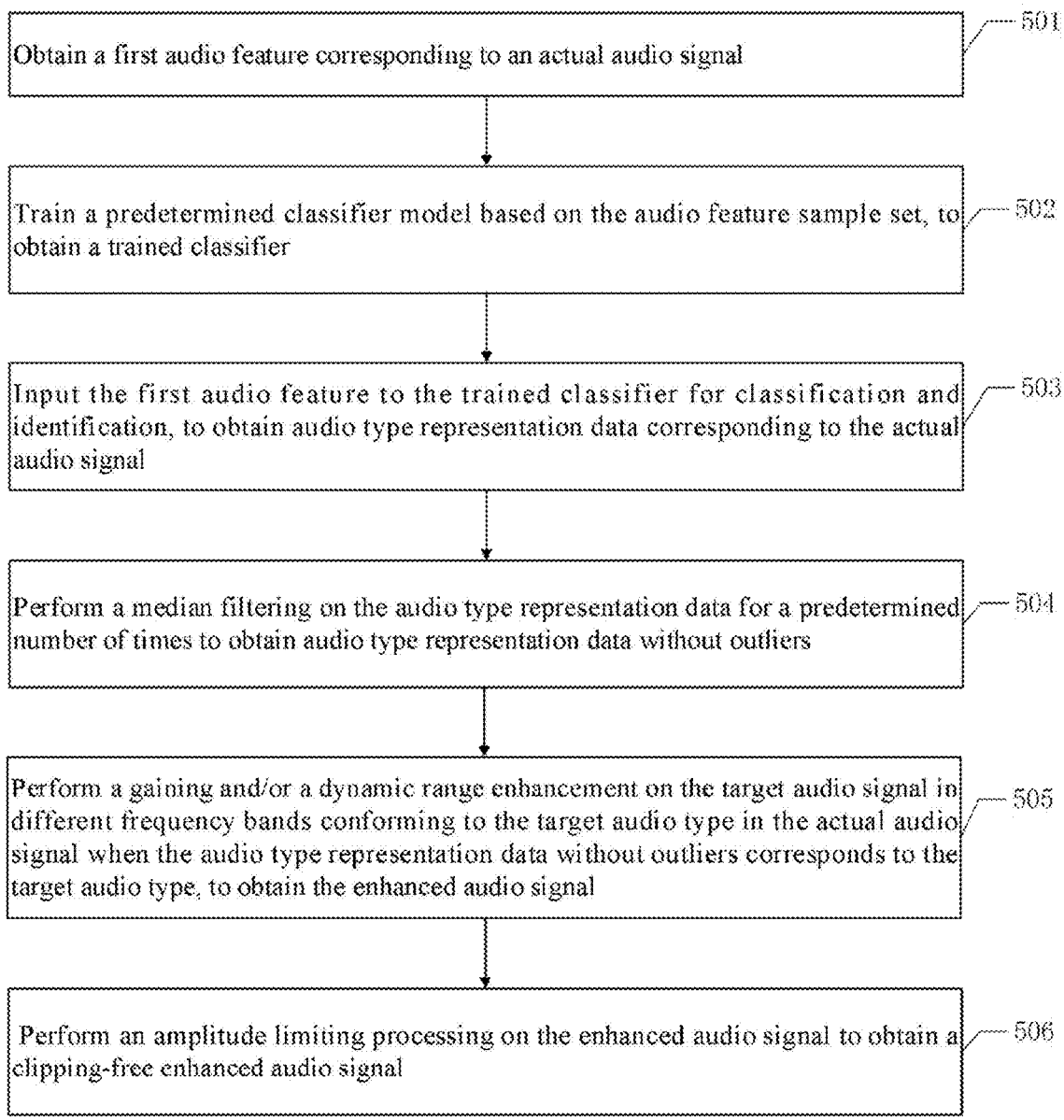
FIG. 5 shows a refined flowchart of an audio signal enhancement method according to a second embodiment of the present application.

The method shown in FIG. 5 is a refined audio signal enhancement method of the second embodiment of the present application. The audio signal enhancement method includes the following steps.

Step 501: a first audio feature corresponding to an actual audio signal is obtained.

Specifically, in this embodiment, the actual audio signal may be the audio signal of various types in the actual application scenario such as a certain game, such as footstep sounds, gunshots, or propeller sounds in the game.

Step 502: a predetermined classifier model is trained based on the audio feature sample set, to obtain a trained classifier.

Specifically, in this embodiment, the predetermined audio signal sample set includes a target audio signal set such as a footstep sound audio data set, and a non-target audio signal set such as a non-footstep sound audio data set. The target audio signal set and the non-target audio signal set include target audio signals such as footstep sounds and non-target audio signals such as non-footstep sounds in various scenarios, respectively. The audio features of the audio signal samples in the audio signal sample set are extracted separately to obtain the audio feature sample set, and the audio feature sample set is divided into a training set and a test set. The pre-prepared classifier model is trained based on the training set of the audio feature sample set and the machine learning classification method, to obtain a classifier capable of correctly distinguishing between the target audio signal and the non-target audio signal. Commonly used machine learning classification methods such as Support Vector Machines (SVM), Gaussian Mixture Models (GMM), and Convolutional Neural Networks may be employed to train the classifier model.

Step 503: the first audio feature is input to the trained classifier for classification and identification, and audio-type representation data corresponding to the actual audio signal is obtained.

Specifically, in this embodiment, after obtaining the audio features, the trained classifier is configured to classify and identify the audio features, and the audio-type representation data corresponding to the actual audio signal is outputted. This embodiment optionally utilizes 0 and 1 to represent audio types, where 1 represents target audio signals such as footstep sounds, and 0 denotes non-target audio signals such as non-footstep sounds.

Step 504: a median filtering is performed on the audio-type representation data for a predetermined number of times to obtain audio-type representation data without outliers.

Specifically, in this embodiment, after outputting the audio-type representation data 0/1 signal, the classifier may also perform the median filtering on the 0/1 signal through the median filter, which may be performed once or twice to remove the outliers and obtain the square wave signal. The window length of the median filter used in this embodiment is 3.

Step 505: a gaining and/or a dynamic range enhancement are performed on the target audio signal in different frequency bands conforming to the target audio type in the actual audio signal when the audio-type representation data without outliers correspond to the target audio type, to obtain the enhanced audio signal.

When the audio-type representation data is 1, the target audio signal in different frequency bands is enhanced by EQ/DRC through gain and/or dynamic range enhancement. When the audio-type representation data is 0, no enhancement is performed using EQ/DRC. EQ is typically implemented using peak filters to enhance the gain of target audio signals in different frequency bands, while DRC may be multi-band and is configured to apply different dynamic compression or enhancement parameters to the target audio signals in different frequency bands, to obtain an enhanced audio signal.

Step 506: an amplitude limiting processing is performed on the enhanced audio signal to obtain a clipping-free enhanced audio signal.

Specifically, in this embodiment, in order to prevent the enhanced audio signal from being too large and clipping, the enhanced audio signal will also be limited by a limiter to obtain a clipping-free enhanced audio signal.

It should be understood that the order of the steps in this embodiment, as indicated by their respective numbers, does not necessarily imply a sequential order of execution. The sequence of the steps should be determined based on their functions and internal logic, rather than being the only limitation to the implementation process of the embodiments of the present application.

In the method of audio signal enhancement disclosed in this embodiment of the present application, the first audio feature corresponding to the actual audio signal is obtained. The first audio feature is inputted to a trained classifier for classification and identification, to obtain the audio-type representation data corresponding to the actual audio signal. A target audio signal conforming to a target audio type in the actual audio signal is enhanced with reference to the audio-type representation data, to obtain an enhanced audio signal. Through the implementation of the present application, the actual audio signal is classified and identified using the trained classifier, and the target audio signal conforming to the target audio type is enhanced, thereby effectively enhancing the target audio signal and improving the accuracy of enhancing the target audio signal.

FIG. 6 shows an audio signal enhancement apparatus of a third embodiment of the present application. The audio signal enhancement apparatus can be used to implement the audio signal enhancement method in the above-mentioned embodiments. As shown in FIG. 6, the audio signal enhancement apparatus mainly includes an obtaining module 601, a classifying module 602, and an enhancing module 603.

The obtaining module 601 is configured to obtain a first audio feature corresponding to an actual audio signal.

The classifying module 602 is configured to input the first audio feature to a trained classifier for classification and identification, to obtain audio-type representation data corresponding to the actual audio signal.

The enhancing module 603 is configured to enhance a target audio signal conforming to a target audio type in the actual audio signal with reference to the audio-type representation data, to obtain an enhanced audio signal.

In some implementations of this embodiment, the audio signal enhancement apparatus further includes a first computing module configured to frame the actual audio signal according to the framing indicator to obtain a second frame signal, where the audio features include at least one of the following types: time domain feature, frequency domain feature, and time-frequency domain feature; and perform an average operation and a variance operation on a target audio feature in the second audio feature combination to obtain the first audio feature; or, perform an average operation and a variance operation on the second audio feature combination of the actual audio signal and a second audio feature combination of the historical audio signal to obtain the first audio feature, where a moment of obtaining the historical audio signal is before a moment of obtaining the actual audio signal.

In some implementations of the present embodiment, the audio signal enhancement apparatus further includes a training module configured to obtain a predetermined audio signal sample set; obtain the second audio features corresponding to each of a plurality of audio signal samples in the audio signal sample set separately, to obtain the audio feature sample set; and train a predetermined classifier model based on the audio feature sample set, to obtain the trained classifier.

Further, in some implementations of the present embodiment, the audio signal enhancement apparatus further includes a second computing module configured to first frame signals are obtained by framing each of the audio signal samples in the audio signal sample set according to a predetermined framing indicator, where the framing indicator includes a unit length of each data frame, an overlap length of adjacent data frames; extract the audio features in each of the first frame signals separately to obtain a first audio feature combination, where the audio features include at least one of the following types: time domain feature, frequency domain feature, and time-frequency domain feature; and perform an average operation and a variance operation on a target audio feature in the first audio feature combination to obtain the second audio feature.

In some implementations of this embodiment, the enhancing module 603 is specifically configured to: perform a median filtering on the audio-type representation data for a predetermined number of times to obtain audio-type representation data without outliers; perform a gaining and/or a dynamic range enhancement on the target audio signal in different frequency bands conforming to the target audio type in the actual audio signal when the audio-type representation data without outliers correspond to the target audio type, to obtain the enhanced audio signal.

Further, in some embodiments of this embodiment, the enhancing module 603 is further configured to: perform the gaining with reference to a predetermined equalizer fade-in and fade-out time, and/or, perform the dynamic range enhancement with reference to a predetermined time parameter for dynamic range control, on the target audio signal in the different frequency bands conforming to the target audio type in the actual audio signal.

In some implementations of this embodiment, the audio signal enhancement apparatus further includes an amplitude limiting module, which is configured to perform an amplitude limiting processing on the enhanced audio signal to obtain a clipping-free enhanced audio signal.

It should be noted that the audio signal enhancement methods of the first and second embodiments can both be implemented based on the audio signal enhancement apparatus provided in this embodiment. Those skilled in the art can clearly understand that for the sake of convenience and conciseness of description, the specific working process of the audio signal enhancement device described in this embodiment can refer to the corresponding process in the above-mentioned method embodiments, which will not be repeated herein.

In the audio signal enhancement apparatus provided in this embodiment, the first audio feature corresponding to the actual audio signal is obtained. The first audio feature is inputted to a trained classifier for classification and identification, to obtain the audio-type representation data corresponding to the actual audio signal. A target audio signal conforming to a target audio type in the actual audio signal is enhanced with reference to the audio-type representation data, to obtain an enhanced audio signal. Through the implementation of the present application, the actual audio signal is classified and identified using the trained classifier, and the target audio signal conforming to the target audio type is enhanced, thereby effectively enhancing the target audio signal and improving the accuracy of enhancing the target audio signal.

Figure 7:
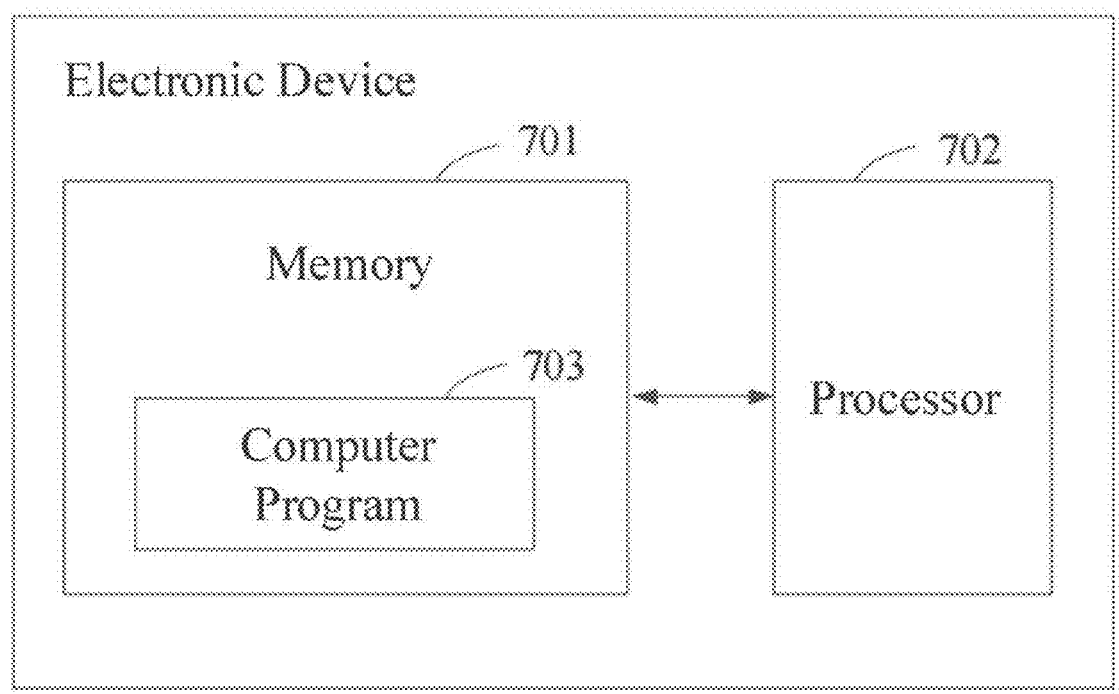
FIG. 7 shows a structural diagram of an electronic device according to a fourth embodiment of the present application.

Referring to FIG. 7, FIG. 7 provides an electronic device of a fourth embodiment of the present application. The electronic device may be used to implement the audio signal enhancement method in the above-mentioned embodiments. As shown in FIG. 7, the electronic device mainly includes a memory 701, a processor 702, and a computer program 703 stored in the memory 701 and runnable on the processor 702. The processor 702, when executing the computer program 703, implements the audio signal enhancement method of the above-mentioned embodiments. The number of processors may be one or more.

The memory 701 may be a high-speed random access memory (RAM), or a non-volatile memory, such as disk memory. The memory 701 is configured to store executable program code, and the processor 702 is coupled to the memory 701.

Further, embodiments of the present application provide a computer-readable storage medium, which may be provided in the electronic device in the above-mentioned embodiment, and the computer-readable storage medium may be the memory in the above-mentioned embodiment shown in FIG. 7.

The computer-readable storage medium stores a computer program that, when executed by a processor, implements the audio signal enhancement method described in the above-mentioned embodiments. Furthermore, the computer storage medium may be a USB flash drive, a mobile hard drive, a read-only memory (ROM), a random-access memory (RAM), a disk, or a CD-ROM, and any other medium capable of storing program code.

In the several embodiments provided in the present application, it should be understood that the disclosed apparatus and method, may be implemented in other ways. For example, the apparatus embodiments described above are only illustrative, and the module partitioning is only one logical function partitioning. In practical implementation, there may be other ways of partitioning, such as multiple modules or components combined or integrated into another system, or some features may be ignored or not executed. In addition, the displayed or discussed couplings or direct couplings or communication connections between them may be indirect couplings or communication connections through some interfaces, apparatuses, or modules, which may be electrical, mechanical, or other forms.

The modules illustrated as separate components may or may not be physically separate, and the components shown as modules may or may not be physical modules, i.e., they may be located in one place or may be distributed to a plurality of network modules. Some or all of these modules may be selected according to practical needs to achieve the purpose of the solution of the embodiments.

In addition, each functional module in each embodiment of the present application may be integrated into a single processing module, or each module may be physically present separately, or two or more modules may be integrated into a single module. The above-mentioned integrated modules may be implemented either in the form of hardware or in the form of software functional modules.

If the integrated module is implemented as a software functional module and sold or used as an independent product, it may be stored in a computer-readable storage medium. Based on this understanding, the technical solution provided in this application, essentially, or the part or all of the technical solution that contributes to the prior art may be embodied in the form of a software product. The computer software product is stored in a readable storage medium, including several instructions that enable a computer device (such as a personal computer, server, network device, etc.) to perform all or part of the steps of the various embodiments described in the present application. The above-mentioned readable storage medium includes various media capable of storing program code, such as USB dishes, mobile hard disks, ROM, RAM, disks, or CDs.

It should be noted that for the various method embodiments described above, for the sake of simplicity, they are expressed as a series of combinations of actions. However, those skilled in the art should know that the present application is not limited by the order of the described actions, as certain steps may be performed in a different order or simultaneously according to the present application. Secondly, those skilled in the art should also know that the embodiments described in the specification are preferred embodiments, and the actions and modules involved are not necessarily essential to the present application.

In the above-mentioned embodiments, each embodiment is described with a specific focus, and parts that are not detailed in one embodiment may be referenced in the relevant description of other embodiments.

Described above is a description of the audio signal enhancement method, apparatus, device, and readable storage medium provided in the present application. For those skilled in the art, there will be changes in the specific implementation and application scope based on the ideas of the embodiments of the present application, and in summary, the contents of this specification should not be understood as a limitation of the present application.

What is claimed is:

1. An audio signal enhancement method, comprising:
   obtaining a first audio feature corresponding to an actual audio signal;
   inputting the first audio feature to a trained classifier for classification and identification, to obtain audio-type representation data corresponding to the actual audio signal; and
   enhancing a target audio signal conforming to a target audio type in the actual audio signal with reference to the audio-type representation data, to obtain an enhanced audio signal;
   wherein the step of enhancing the target audio signal conforming to the target audio type in the actual audio signal with reference to the audio-type representation data to obtain the enhanced audio signal comprises:
   performing a median filtering on the audio-type representation data for a predetermined number of times to obtain audio-type representation data without outliers; and
   performing a gaining and/or a dynamic range enhancement on the target audio signal in different frequency bands conforming to the target audio type in the actual audio signal when the audio-type representation data without outliers correspond to the target audio type, to obtain the enhanced audio signal;
   wherein the step of performing the gaining and/or the dynamic range enhancement on the target audio signal in the actual audio signal in different frequency bands conforming to the target audio type comprises:
   performing the gaining with reference to a predetermined equalizer fade-in and fade-out time, and/or, performing the dynamic range enhancement with reference to a predetermined time parameter for dynamic range control, on the target audio signal in the different frequency bands conforming to the target audio type in the actual audio signal;
   wherein after the step of enhancing the target audio signal conforming to the target audio type in the actual audio signal with reference to the audio-type representation data to obtain the enhanced audio signal, the method further comprises:
   performing an amplitude limiting processing on the enhanced audio signal to obtain a clipping-free enhanced audio signal.

2. The audio signal enhancement method of claim 1, wherein the step of inputting the first audio feature to the trained classifier for classification and identification is preceded by:
   obtaining a predetermined audio signal sample set;
   obtaining a second audio feature corresponding to each of a plurality of audio signal samples in the audio signal sample set separately, to obtain an audio feature sample set; and
   training a predetermined classifier model based on the audio feature sample set, to obtain a trained classifier.

3. The audio signal enhancement method of claim 2, wherein the step of obtaining the second audio feature corresponding to each of the plurality of audio signal samples in the audio signal sample set separately is preceded by:
   obtaining first frame signals by framing each of the audio signal samples in the audio signal sample set according to a predetermined framing indicator; wherein the framing indicator comprises a unit length of each data frame, an overlap length of adjacent data frames;
   extracting an audio feature in each of the first frame signals separately to obtain a first audio feature combination; wherein the audio features comprise at least one of the following types: time domain feature, frequency domain feature, and time-frequency domain feature; and
   performing an average operation and a variance operation on a target audio feature in the first audio feature combination to obtain the second audio feature.

4. The audio signal enhancement method of claim 3, wherein the step of obtaining the first audio feature corresponding to the actual audio signal is preceded by:
   obtaining second frame signals by framing the actual audio signal according to the framing indicator;
   extracting an audio feature in each of the second frame signal separately to obtain a second audio feature combination; wherein the audio features comprise at least one of the following types: time domain feature, frequency domain feature, and time-frequency domain feature; and
   performing an average operation and a variance operation on a target audio feature in the second audio feature combination to obtain the first audio feature;
   or, performing an average operation and a variance operation on the second audio feature combination of the actual audio signal and a second audio feature combination of a historical audio signal to obtain the first audio feature; wherein a moment of obtaining the historical audio signal is before a moment of obtaining the actual audio signal.

5. An electronic device, comprising:
   a memory; and
   a processor configured to execute a computer program stored in the memory;
   wherein the processor executes the computer program to implement steps of the method of claim 1.

6. A non-transitory computer-readable storage medium having a computer program stored thereon, wherein the computer program, when executed by the processor, implements steps of the method of claim 1.

7. An audio signal enhancement apparatus, comprising:
   an obtaining module, configured to obtain a first audio feature corresponding to an actual audio signal;
   a classifying module, configured to input the first audio feature to a trained classifier for classification and identification, to obtain audio-type representation data corresponding to the actual audio signal; and
   an enhancing module, configured to enhance a target audio signal conforming to a target audio type in the actual audio signal with reference to the audio-type representation data, to obtain an enhanced audio signal, comprising, performing a median filtering on the audio-type representation data for a predetermined number of times to obtain audio-type representation data without outliers; and
   performing a gaining and/or a dynamic range enhancement on the target audio signal in different frequency bands conforming to the target audio type in the actual audio signal when the audio-type representation data without outliers correspond to the target audio type, to obtain the enhanced audio signal;
   wherein the step of performing the gaining and/or the dynamic range enhancement on the target audio signal in the actual audio signal in different frequency bands conforming to the target audio type comprises:

performing the gaining with reference to a predetermined equalizer fade-in and fade-out time, and/or, performing the dynamic range enhancement with reference to a predetermined time parameter for dynamic range control, on the target audio signal in the different frequency bands conforming to the target audio type in the actual audio signal;

wherein after the step of enhancing the target audio signal conforming to the target audio type in the actual audio signal with reference to the audio-type representation data to obtain the enhanced audio signal, the method further comprises:

performing an amplitude limiting processing on the enhanced audio signal to obtain a clipping-free enhanced audio signal.

* * * * *